Nov. 22, 1938. D. C. TURNBULL 2,137,254
DUST COLLECTOR
Filed March 3, 1936
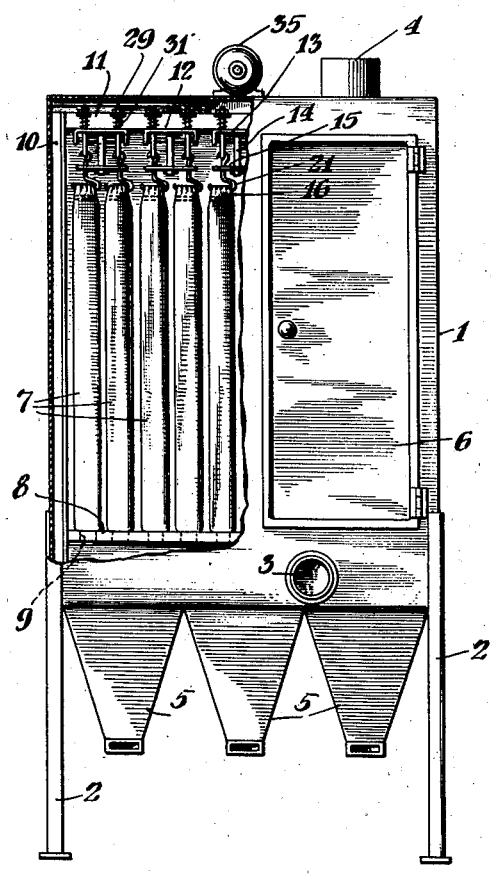
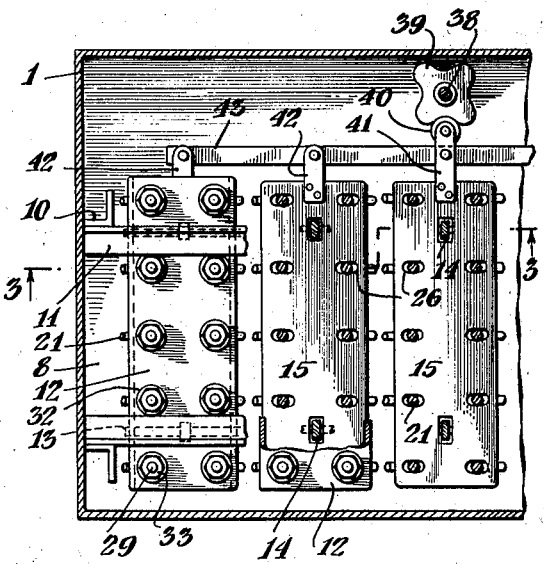
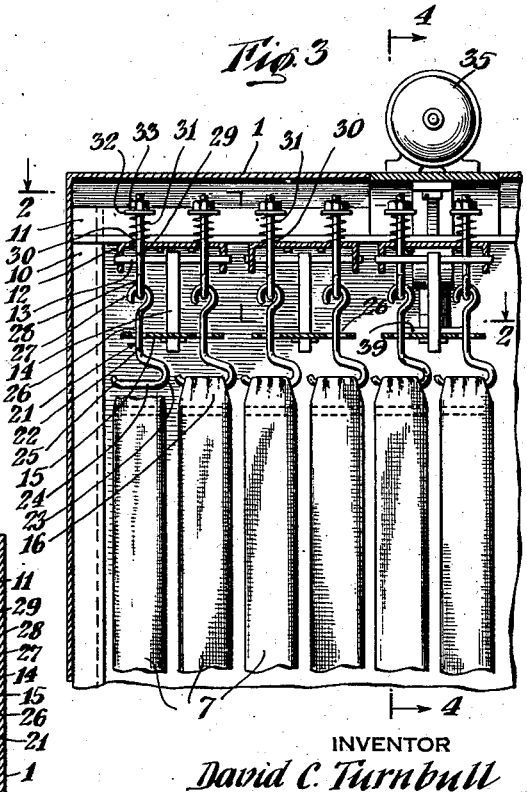
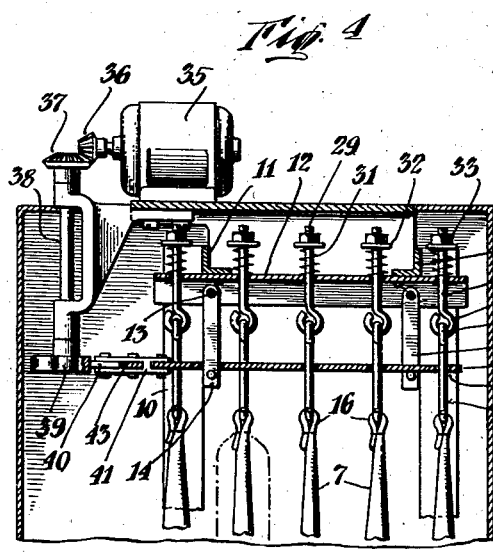
INVENTOR
David C. Turnbull
BY
Austin & Dix
ATTORNEYS Patented Nov. 22, 1938

2,137,254

UNITED STATES PATENT OFFICE 2,137,254

DUST COLLECTOR

David C. Turnbull, Mishawaka, Ind., assignor to The American Foundry Equipment Company, Mishawaka, Ind., a corporation of Delaware Application March 3, 1936, Serial No. 66,813

7 Claims. (Cl. 183—58)

This invention relates to dust collectors, and particularly to a novel supporting and shaking mechanism for dust collectors of the bag filter type.

According to the invention, the construction comprises a suitable housing having therein one or more tubular filter bags through which the air or other gaseous material to be cleaned or filtered is passed to deposit the entrained solid material on the bag walls. Each bag is suspended from a fixed support within the housing by a connecting element such as a hook, which preferably is resiliently and adjustably connected to the support. The shaking mechanism preferably consists of one or more plates or other members engageable with the suspension member, and vibrated by a suitable mechanism to cause the connected filter element to be vibrated to shake loose the collected solid material.

The invention also provides a construction wherein the filter bags may be directly supported without necessitating the use of any special end cap or other attaching members, and which permits the filter bags to be readily adjusted from the outside. The supporting construction also automatically compensates for any variation in the lengths of the filter bags, and maintains them sufficiently tight to prevent sagging and leakage. The shaking mechanism provides means whereby the filter bags may be easily and effectively agitated to remove collected solid material without injuring the filter bags or loosening them in their seats.

Various other features and advantages of the invention will be apparent from the following particular description and from an inspection of the accompanying drawing.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which:

Fig. 1 is a view in elevation showing a dust collector constructed according to the invention, a portion of the structure being broken away to show the interior;

Fig. 2 is a view showing a horizontal section taken along the line 2—2 of Fig. 3;

Fig. 3 is a view showing a vertical section taken along the line 3—3 of Fig. 2;

Fig. 4 is a view showing a section taken along the line 4—4 of Fig. 3.

The present invention is capable of being applied to numerous forms of dust collectors employing bag type filter elements, as will be apparent. Referring now particularly to Fig. 1, there is shown a housing 1 mounted on a suitable support 2, and having an inlet opening 3, an outlet opening 4, collecting hoppers 5, and a door 6 permitting access to the interior of the housing 1.

Disposed within the housing 1 is, preferably, a plurality of elongated, tubular filter elements 7 of the bag type, open at their lower ends and suitably connected at their lower ends to a cell plate 8, having openings 9 cooperating with the open lower ends of the elements 7. Preferably, the elements are arranged in a series of rows and columns, as shown.

A plurality of upright structural members 10 may support at the upper portion of the housing 1 a plurality of cross members 11, to which is secured a plurality of channels 12 the webs of which form mounting plates. Extending through the flanges of each channel 12, is a plurality of rock shafts 13 carrying depending hangers 14, which extend through shaker plates 15 extending the length of the rows of filter elements. A cotter pin extends through each hanger 14 to connect the shaker plates 15 thereto, for swingable movement relative to the housing 1.

Each element 7 is provided with a loop portion 16 at its upper end, which may be formed by folding back the end of the element and stitching or otherwise securing it to the adjacent portion of the element 7. Each element 7, preferably, is supported by a hook 21 having a straight and normally vertical shank portion 22, an offset rebent portion 23, a straight supporting portion 24 substantially perpendicular to the shank 22, and an upturned end 25. The supporting portion 24 is adapted to pass through the loop 16 of the corresponding element 7, and the shank portion 22 passes through a suitable slot 26 in the shaker plate 15. The shank 22 terminates in an eye portion 27, which engages with a cooperating eye portion 28 formed in the end of a supporting bolt 29, thus suspending the hook 21 for swinging movement. The bolt 29 extends through an opening 30 in the channel 12, and is positioned with respect to the channel by a coil spring 31 bearing against the top surface of the channel and against a washer 32 adjustably positioned by a nut 33 threaded on the end of the bolt 29. If desired, the bolt 29 may be sufficiently loose in the opening to permit the bolt 29 to rock in the channel 12.

Each filter element 7 can be readily removed and replaced by merely depressing the bolt 29 and removing the hook 21 from the loop 16. The tension on the element 7 can be adjusted by adjustment of the nut 33, and, owing to the tension exerted by the spring 31, the element 7 will be under sufficient tension to prevent leakage, at the cell plate, over a considerable range of change in length due to adjustment or stretching. The hook 21, preferably, is so shaped that the force exerted thereby on the element 7 is centrally of the element, and in a direction along the axis thereof.

The shaker plates 15 are actuated from a motor 35 which, preferably, is energized periodically or otherwise by suitable means (not shown). The motor 35 drives a gear 36 meshing with a gear 37 driving a shaft 38 carrying a cam 39, which may be formed as a star wheel. The cam 39 actuates a follower 40 rotatably supported on a bar 41, which may be attached to one of the shaker plates 15. The remaining shaker plates 15 are provided with bars 42 which may be connected together by a gang bar 43. Upon energization of the motor 35, it drives the cam 39 to reciprocate the gang bar 43 and swing the attached shaker plates 15, which strike the shanks 22 of the hooks 21 and cause them to be agitated thereby to shake the connected elements 7.

It will now be seen that the invention provides a supporting and shaking element for a dust collector which is simple and inexpensive to construct, easy to instal, adjust and replace, and which is effective and certain in operation. The arrangement permits ready adjustment of the tension on the individual filter elements, and ensures that each filter element will be under tension so as to prevent leakage or sagging. The shaking mechanism produces a very pronounced agitation of the filter elements without any liability of damage thereto, since the suspension arrangement permits relief of any undue stresses set up in the filter elements during shaking.

While certain novel features of the invention have been disclosed and are pointed out in the annexed claims, it will be understood that various omissions, substitutions and changes may be made by those skilled in the art without departing from the spirit of the invention.

What is claimed is:

1. In a dust collector, in combination, a housing structure, a mounting plate fixed in said housing, a filter element in said housing structure, a shaker plate in said housing structure, means swingably mounting said shaker plate, a suspension hook engaging said filter element and having a shank extending through said shaker plate, a suspension member engaging said suspension hook and having a portion extending through said mounting plate, spring means surrounding the portion beyond said mounting plate and resiliently supporting said suspension member from said mounting plate, and means for agitating said shaker plate to effect agitation of said suspension hook and the connected filter element.

2. A dust collector including in combination, a frame, a mounting plate supported on said frame, a plurality of suspension bolts extending through said mounting plate, adjustable spring means engaging said suspension bolts above said mounting plate for resiliently and adjustably mounting said bolts, a shaker plate, means swingably supporting said shaker plate below said mounting plate, a plurality of hooks swingably suspended from said suspension bolts and extending through said shaker plate, filter bags suspended from each of said hooks, and means for agitating said shaker plate whereby to agitate said hooks and shake said bags.

3. A dust collector including in combination, a frame, a mounting plate supported on said frame, a plurality of suspension bolts extending through said mounting plate and rockable therein, a shaker plate, means swingably supporting said shaker plate from said mounting plate, a plurality of hooks swingably suspended from said bolts and extending through said shaker plate, said hooks rockable with respect to said shaker plate, filter bags suspended from said hooks, and means for agitating said shaker plate whereby to rock said hooks and agitate said bags.

4. In a dust collector, in combination, a supporting structure, a single chambered filter bag having a loop in the upper end thereof, and means for supporting said filter bag on said supporting structure including a hook member having a portion extending through the bag loop and directly engaging and suspending said filter bag, a shank extending substantially perpendicularly to said bag-engaging portion, and a portion connecting the end of the shank with the end of said bag-engaging portion whereby the shank is centered with respect to the bag-engaging portion, and means supporting said hook from said supporting structure.

5. In a dust collector, in combination, a supporting structure, a filter bag having an end turned over and secured to the body of the bag to form a loop, a one-piece suspension hook having a substantially straight bag-engaging portion adapted to extend through said loop, a shank portion substantially centered with respect to said straight portion and a portion integral with and connecting the shank to an end of said bag-engaging portion, and means engageable with said suspension hook for supporting it from said supporting structure.

6. A dust collector including in combination, a support, a mounting plate, a filter bag having a loop formed therein at one end, a suspension member having a shank extending through and projecting above said mounting plate and a hook-receiving portion below said mounting plate, a suspension hook having a free, elongated bag-engaging portion extending through the loop in said filter bag and turned up at its extreme end to maintain said bag on said bag-engaging portion, a shank, and a hook portion adapted to support said hook on said suspension member for free swinging movement thereon.

7. In a dust collector, in combination, a housing, a mounting member, an agitating member movably supported from said mounting member, a plurality of filter bags in said housing, each having its upper end turned over and secured to the body of the bag to form a loop, a suspension hook for directly engaging each bag and having a substantially straight, bag-engaging portion insertable into said loop from one end and turned up at one end to restrain the loop against displacement, and a shank connected to the other end of and centered with respect to said bag-engaging portion, said shank extending through an opening in said agitating member, means including suspension members extending through said mounting member, resilient means engageable with said suspension members above said mounting member for resiliently and adjustably positioning said hooks with respect to said agitating member, and means for agitating said agitating member to shake said bags.

DAVID C. TURNBULL.